United States Patent [19]

Yonehara

[11] Patent Number: 5,285,446
[45] Date of Patent: Feb. 8, 1994

[54] CELL FLOW CONTROL UNIT AND METHOD FOR ASYNCHRONOUS TRANSFER MODE SWITCHING NETWORKS

[75] Inventor: Akifumi Yonehara, Tokyo, Japan

[73] Assignee: NEC Corporation, Japan

[21] Appl. No.: 798,111

[22] Filed: Nov. 26, 1991

[30] Foreign Application Priority Data

Nov. 27, 1990 [JP] Japan .................. 2-321196

[51] Int. Cl.$^5$ .................. H04L 12/26; H04L 12/56
[52] U.S. Cl. .................. 370/60.1; 370/94.2
[58] Field of Search .............. 370/60, 601, 94.1, 94.2, 370/13, 17

[56] References Cited

U.S. PATENT DOCUMENTS

| | | | |
|---|---|---|---|
| 4,896,316 | 1/1990 | Lespagnol et al. | 370/94.1 |
| 4,914,650 | 4/1990 | Sriram | 370/94.1 |

*Primary Examiner*—Wellington Chin
*Attorney, Agent, or Firm*—Ostrolenk, Faber, Gerb & Soffen

[57] ABSTRACT

A cell flow control unit for use in ATM transmission networks is provided with a cell buffer memory circuit for temporarily storing a plurality of ATM cells each of which has a predetermined number of bits and is transmitted at any time interval via either an input virtual path or an input virtual channel in the sequence of their transmission, a timing control circuit for generating first and second timing pulses to define, respectively a first period of a predetermined length and a second period equal in length to an integral multiple of this predetermined length; and a reading pulse control circuit for generating a first pulse sequence to be fed to the cell buffer memory circuit to read the ATM cells out of the cell buffer memory circuit and transferring them to an output virtual path and either an output virtual channel or a self-routing switch, and a second pulse sequences indicating how many times the ATM cells have been read out of the cell buffer memory circuit. It is further provided with an excess cell processing circuit responsive to the first timing pulse for counting the pulses of the second pulse sequence to generate a first count, comparing the first count and a first reference value corresponding to the maximum number of cells which can be transferred within the first period and, when the two values are found identical, initializing the cell buffer memory circuit; another excess cell processing circuit responsive to the second timing pulse for counting the number of the ATM calls to generate a second count, comparing the second count and a second reference value corresponding to the maximum number of cells which can be transferred within the second period, generating a first excess cell detection signal when the two values are found identical, supplying the first excess cell detection signal to the reading pulse control circuit, and controlling the control circuit so as to cause the control circuit to be responsive to the first excess cell detection signal for generating the first and second pulse sequences at time intervals corresponding to the average for the first period of the maximum number of cells which can be transferred within the second period; and still another excess cell processing circuit responsive to the second timing pulse for counting the pulses of the second pulse sequence to generate a third count, comparing the third count and a third reference value corresponding to the maximum number of cells which can be transferred within the second period, generating a second excess cell detection signal when the two values are found identical, and supplying the second excess cell detection signal to the reading pulse processing circuit to stop the generation of the first and second pulse sequences.

10 Claims, 5 Drawing Sheets

CELL FLOW CONTROL UNIT AND METHOD FOR ASYNCHRONOUS TRANSFER MODE SWITCHING NETWORKS

BACKGROUND OF THE INVENTION

The present invention relates to a cell flow control unit and method for use in asynchronous transfer mode (ATM) switching or transmission networks.

As means to use efficiently existing communication networks for transmitting, exchanging or transferring (the three functions may hereinafter be generically referred to as transmitting) multi-media information including speech, data and moving picture information, the synchronous transfer mode (STM) and the packet mode are commonly used. The STM uses time division multiplexing, which periodically allocates time slots irrespective of the presence or absence of information to be sent, and allows a single process of communication to occupy exclusively a channel of a certain transmission rate. Therefore, while the transmission rate is fixed over a whole transmission network, the utilization rate of each channel is generally low. These problems are serious in high speed wide band communication network, particularly with communication in a broad band integrated services digital network (ISDN), where the types of information to be transmitted increase with the transmission rate and the frequency bandwidth of the communication network and accordingly a greater diversity of transmission rates comes to be required. On the other hand, in the packet mode, the information to be sent is divided into blocks, each of which is transferred in a packet augmented with a header which indicates routing information. Since a packet is sent as information arises, the transmission rate can be chosen as desired. Transmission in the packet mode, however, requires a complex protocol, and software processing for its execution hinders transmission rate improvement. This problem poses a serious constraint when, for instance, multi-media information involving a large quantity of information including moving picture information is to be transmitted on a real time basis.

In contrast to the STM and the packet mode, which inevitably entail these problems, the ATM, which is an improved packet mode having a unified format in which the packets have a fixed length, makes it possible to simplify said software processing, to increase the transmission rate, and, accordingly, to provide a high speed wide band communication network such as a high speed local area network (LAN) or a wide band ISDN. In view of this advantage, research and development attempts for commercial application of the ATM are being energetically undertaken. A cell for use in ATM transmission usually has a header length of 5 bytes (40 bits) and an information region length of 48 bytes (384 bits) in accordance with the CCITT Recommendations I.150 and I.361. The ATM, using cell multiplexing on the basis of header information, permits a substantial change in the transmission rate of multi-media information through a high speed transmission path (link) of 156 Mbps in transmission rate. Thus, there is used a self-routing switch which selects the cell transmission path (virtual path or virtual channel) on the basis of header information, and the ATM places this switch control under distributed processing. Since the processor for network control has no direct part in this switch control, high speed transmission of multi-media information is made possible.

Architecture of a high speed wide band communication network for high speed transmission of multi-media information in the ATM indispensably requires a cell flow control function to limit the flow rate of cells with an ATM layer having a high throughput, because uneven distribution of traffic would adversely affect the utilization efficiency of the whole transmission network. A cell flow control technique for this purpose is described in U.S. Pat. No. 4,956,839. This cell flow control circuit counts the number of cells transferred within a predetermined period of time on the basis of header information and, when the count surpasses a predetermined maximum, either discards the excess cells or transfers them to the self-routing switch, with the header being converted to indicate that they are an excess. The switch, receiving the transfer of the excess cells, discards them according to the level of traffic at the switch. This way of flow control, which determines whether given cells are an excess or not according to the maximum as the only parameter, is susceptible to the influence of traffic variations. As it entails the processing of header information, which requires complex circuit elements, for excess cell discarding but also is dependent on the self-routing switch downstream for part of the excess cell discarding, the self-routing switch which has to be simple in circuit configuration in order to ensure high speed is complicated by the addition of a buffer memory and otherwise.

SUMMARY OF THE INVENTION

An object of the present invention is to provide a cell flow control unit for use in ATM transmission networks, which enables a whole transmission network to respond flexibly to traffic variations by using, in addition to the number of cells transmitted within a predetermined length of time which conventionally is the only parameter to govern the detection of the maximum of the permissible cell flow, i.e. the presence or absence of the excess cells, another parameter, which is the number of cells transmitted within a period of time equal to an integral multiple of the predetermined length of time.

Another object of the invention is to provide a cell flow control unit for use in ATM transmission networks, which carries out the discarding of excess cells for itself instead of relying on a self-routing switch downstream in the ATM transmission network.

According to the invention, there is provided a cell flow control unit for use in ATM transmission networks, comprising memory for temporarily storing a plurality of ATM cells each of which as a predetermined number of bits and is transmitted at any time interval via either an input virtual path or an input virtual channel in the sequence of their transmission. A first timing signal generator generates first and second timing pulses respectively to define a first period of a predetermined length and a second period equal in length to an integral multiple of this predetermined length. A second timing signal generator generates a first pulse sequence to be fed to the memory to read the ATM cells out of the memory and transfers them to an output virtual path and either an output virtual channel or a self-routing switch, and a second pulse sequence indicating how many times the ATM cells have been read out of the memory. A first counter is responsive to the first timing pulse for counting the pulses of the second pulse sequence to generate a first count, comparing this first count and a first reference value corresponding to the maximum number of cells which can be transferred within the first period and, when the two values are found identical, initializing the memory. A second counter is responsive to the second timing pulse for counting the number of the ATM cells to generate a second count, comparing this second count and a second reference value corresponding to the maximum number of cells which can be transferred within the second period, generating a first excess cell detection signal when the two values are found identical, supplying it to the first timing signal generator, and controlling the first generator so as to cause the first generator to be responsive to the first excess cell detection signal for generating the first and second pulse sequences at time intervals corresponding to the average per the first period of the maximum number of cells which can be transferred within the second period. A third counter is responsive to the second timing pulse for counting the pulses of the second pulse sequence to generate a third count, comparing this third count and a third reference value corresponding to the maximum number of cells which can be transferred within the second period, generating a second excess cell detection signal when the two values are found identical, and supplying it to the first generator to stop the generation of the first and second pulse sequences.

BRIEF DESCRIPTION OF THE DRAWINGS

The above and other objects and features of the present invention may be fully understood from the following detailed description and the accompanying drawings in which.

DETAILED DESCRIPTION OF THE PREFERRED EMBODIMENT

Figure 1:
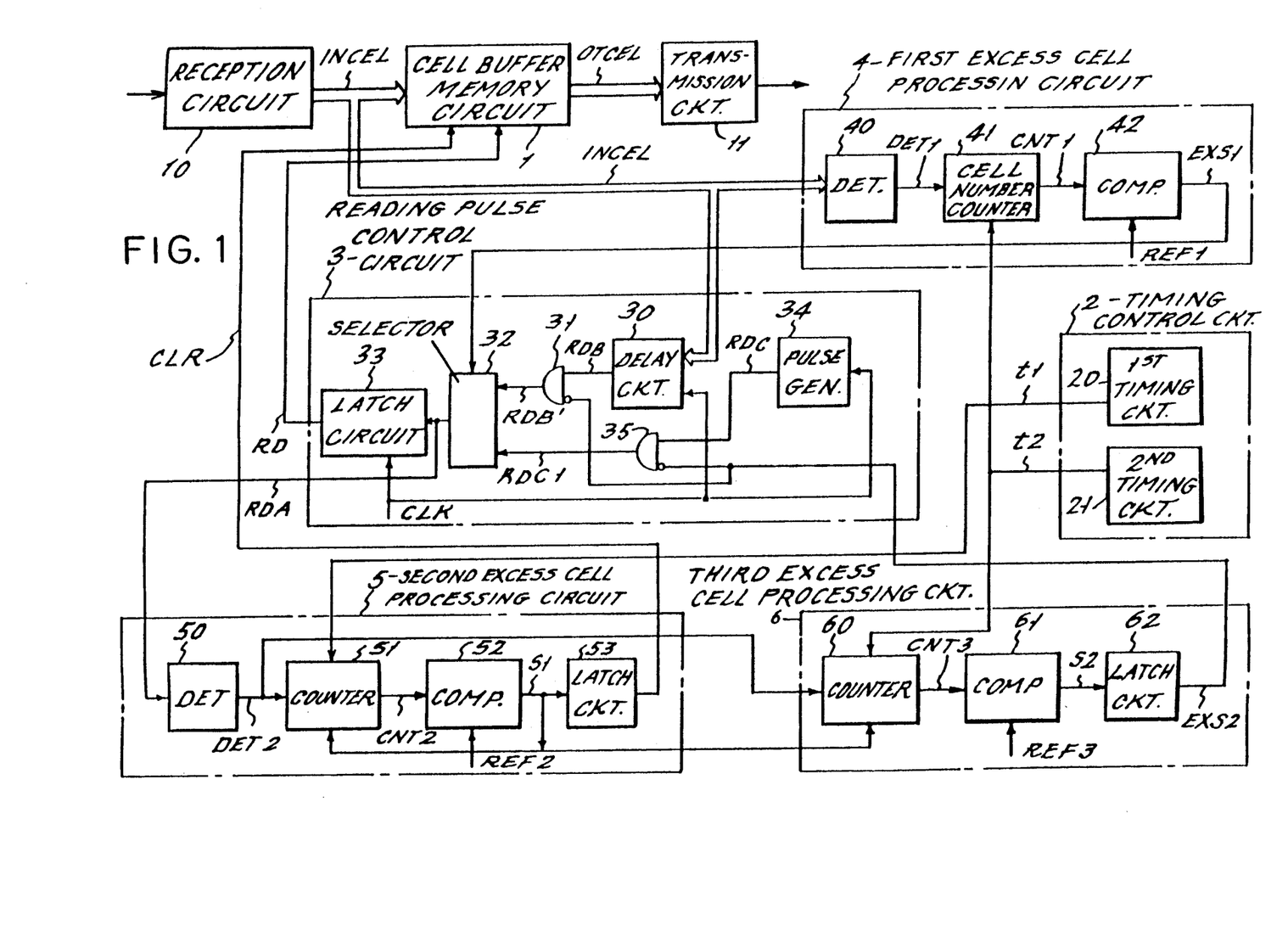
FIG. 1 is a block diagram of a preferred embodiment of the invention.

Referring to FIG. 1, a cell flow control unit which is a preferred embodiment of the present invention, comprising a cell buffer memory circuit 1 for temporarily storing, on the first-on first-out (FIFO) basis, several ATM cells transmitted via a virtual path or a virtual channel of a high speed transmission network and converted into byte-parallel input ATM cells INCEL 12 by a reception circuit 10 involving a synchronous processing circuit and a serial-to-parallel conversion circuit; a timing control circuit 2; a reading pulse control circuit 3, a first excess cell processing circuit 4; a second excess cell processing circuit 5 and a third excess cell processing circuit 6. The cell buffer memory circuit 1, in response to a reading pulse RD, sequentially supplies the byte-parallel ATM cells INCEL, stored on the FIFO basis, as output cells OTCEL one by one. These output cells OTCEL are transferred to a self-routing switch which, connected to a node arranged downstream in this transmission network via a transmission circuit 11 involving a parallel-to-serial conversion circuit, functions as a transmission line or link or as a cross-connect switch. In transferring the output cells OTCEL to this switch, the parallel-to-serial conversion in the transmission circuit 11 is not indispensable. The timing control circuit 2 consists of a first timing signal generator 20 for generating a first timing signal t1 in a predetermined first cycle (t1) and a second timing signal generator 21 for generating a second timing signal t2 in a second cycle (T2), which is equal to an integral multiple of the first cycle (T1). In this preferred embodiment, the generating circuit 20 generates as the timing signal t1 a counter output for counting down a clock CLK of 156 Mbps to 1/5. The generating circuit 21 generates as the timing signal t2 a counter output for counting down said clock CLK to 1/50.

The reading pulse control signal 3, during the period in which it does not receive the supply of an excess cell detection signal EXS1 from the first excess cell processing circuit 4, sends out the reading pulse RD to the buffer memory circuit 1 at the same timing as the input timing of the input cells INCEL. When the excess cell detection signal EXS1 is supplied from the processing circuit 4, the control circuit 3 supplies the reading pulse RD to the buffer memory circuit 1 so that an output cell OTCEL be generated at a timing corresponding to an average value per period corresponding to the first cycle (T1). A delay circuit 30 of the control circuit 3 delays the input cell INCEL in accordance with the clock CLK, and generates a delay output signal RDB having a predetermined time width. This signal RDB, when the third excess cell processing circuit 6 is generating no excess cell detection signal EXS2, is inputted as a delay output RDB' to one of the pair of input terminals of a selector 32 via an AND circuit 31. The selector 32, when no excess cell detection signal EXS1 from the first excess cell processing circuit 4 is entered, supplies the signal RDB' to the second excess cell processing circuit 5 as a reading pulse RDA. A pulse latch circuit 33, to which the pulse RDA is supplied, after holding the pulse RDA for a length of time corresponding to one byte-parallel cell in response to the clock CLK, sends it to the buffer memory circuit 1 as the reading pulse RD. A pulse generator 34 divides the frequency of the clock CLK, and supplies a pulse RDC for each period equal to an integral multiple of the first cycle. This pulse RDC is given by the pulse generator 34 a width substantially equal to those of the reading pulses RD and RDA and, when no excess cell detection signal EXS2 form the processing circuit 6 is supplied, is inputted as a signal RDC' to the other one of said pair of input terminals of the selector 32 via an AND circuit 35. The selector 32, in response to the excess cell detection signal EXS1 from the processing circuit 4, selects the signal RDC' instead of said signal RDB' and provides it as the reading pulse RDA.

The first excess cell processing circuit 4 detects with a detector 40 an input cell INCEL in every one of the second cycles (T2) to generate a detection output DET1, counts with a cell number counter 41 the number of the detection output DET1 units to generate a count CNT1, compares with a comparator 42 this count and a reference value REF1 corresponding to the maximum number of cells transferable within the second cycle (T2) and, if the two values are found equal to each other, supplies the excess cell detection signal EXS1. As is evident from the foregoing description, this detection signal EXS1 indicates that the number of input cells INCEL per the second cycle (T2) has reached its prescribed maximum. In said excess cell processing circuit 4, the counter 41 repeats its operation to count the detection output DET1 until it is supplied with the second timing signal t2, and supplies a count (to be more exact, a signal representing a count) CNT1 for each counting action.

The second excess cell processing circuit 5 counts the number of the reading pulses RDA (ahead of the reading pulse RD by a length of time equivalent to one byte-parallel cell) emerging within the period of said first cycle (T1) to generate a count CNT2, compares this count and a reference value REF2 corresponding to the maximum number of cells transmissible within the period of said first cycle (T1) and, when the two values have become equal to each other, i.e. the number of times reading-out from the cell buffer memory circuit 1 takes place within the period of the first cycle has reached said maximum, stops its counting operation while initializing the cell buffer memory circuit 1. To describe the configuration in more detail, this processing circuit 5 is provided with a detector 50 for detecting the reading pulse RDA from the reading pulse control circuit 3 and generating a detection signal DET2; a counter 51 for repeating the operation to count the detection signals DET2 and to generate a count (to be more exact, a signal representing a count) CNT2 until the first timing signal t1 is supplied; and a comparator 52 for comparing this count CNT2 and a preset reference value RF2 and, when the two values have become equal to each other, generating a signal S1 indicating that the number of times reading-out from the cell buffer memory circuit 1 takes place within the period of said first cycle has reached said maximum. This signal S1, after being held for a length of time equivalent to one byte-parallel cell by a pulse latch circuit 53, becomes a clear signal CLR for initializing the cell buffer memory 1. The signal S1 is supplied both to the counter 51 as a disable signal and to the counter 60, to be described in more detail below, of the third excess cell processing circuit 6 as a disable signal.

The third excess cell processing circuit 6 counts the number of the detection output DET2 units within the period of the second cycle (T2) as the number of the reading pulses RDA to generate a count CNT3, compares the count CNT3 and a reference value REF3 corresponding to the maximum number of cells transmissible within the period of the second cycle (T2) and, when the two values have become equal to each other, stops sending the reading pulses RD and RDA to the cell buffer memory circuit 1 by supplying the excess cell detection signal EXS2 to the control circuit 3. In further detail, this processing circuit 6 is provided with a counter 60 for continuing the operation to count the detection output DE2 units from the detection circuit 50 until the second timing signal t2 is supplied and generating the count (to be more exact, a signal representing a count) CNT3. This counting operation, if the signal S1 is supplied as a disable signal, will continue even if the number of times the generation of the detection output DET2 within the period of the cycle surpasses the maximum. The processing circuit 6 is further provided with a comparator 61 for comparing the count CNT3 and said reference value RF3 and, when the two values have become equal to each other, generating a signal S2 indicating that the number of times reading-out from the cell buffer memory circuit 1 takes place within the period of the second cycle has reached the maximum, and a pulse latch circuit 62 for holding this signal S2 for a length of time equivalent to one byte-parallel cell by a pulse and then supplying it to the control circuit 3 as the excess cell detection signal EXS2.

Figure 2:
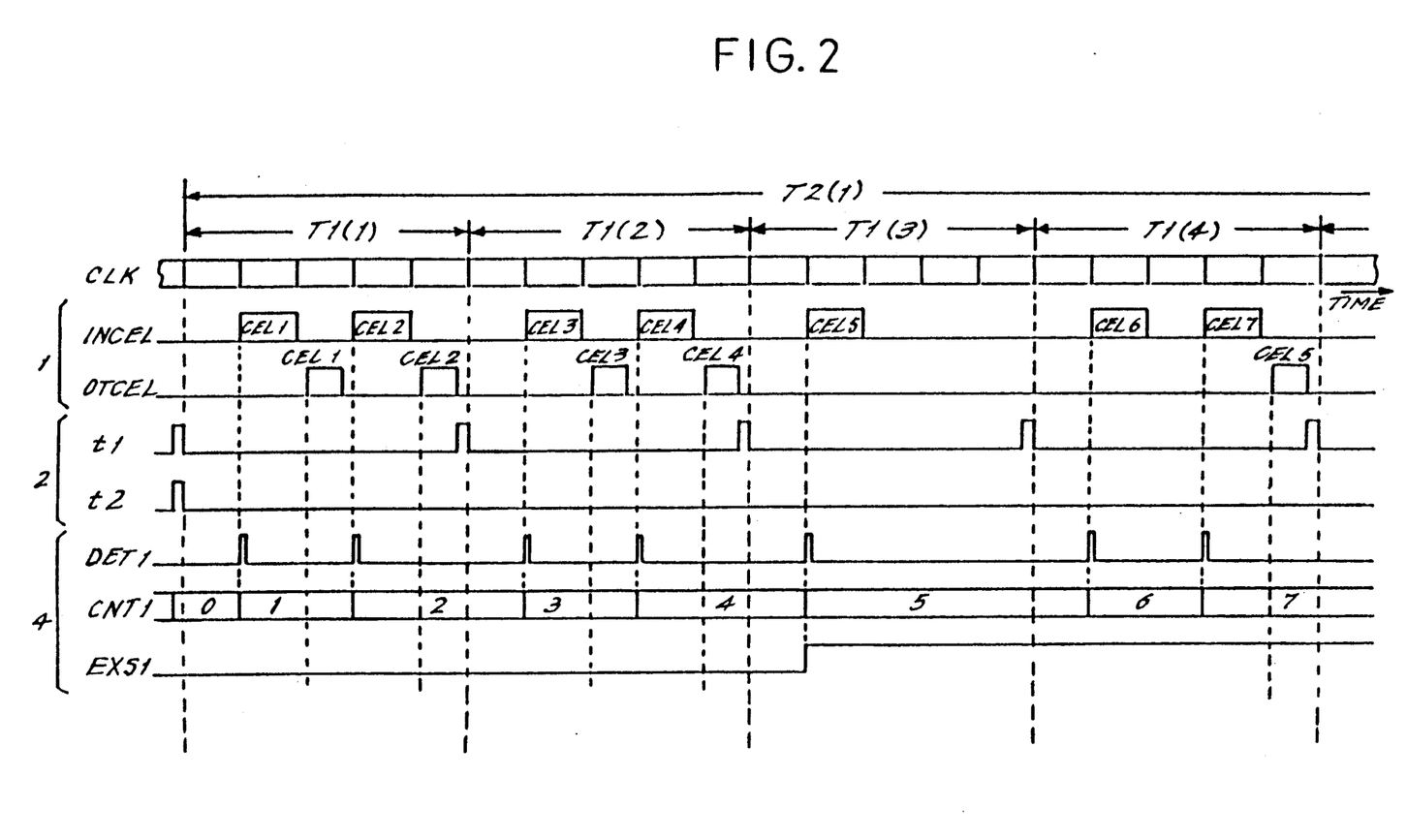
FIGS. 2 and 3 are timing charts for describing operations in this embodiment of the invention.
Figure 3:
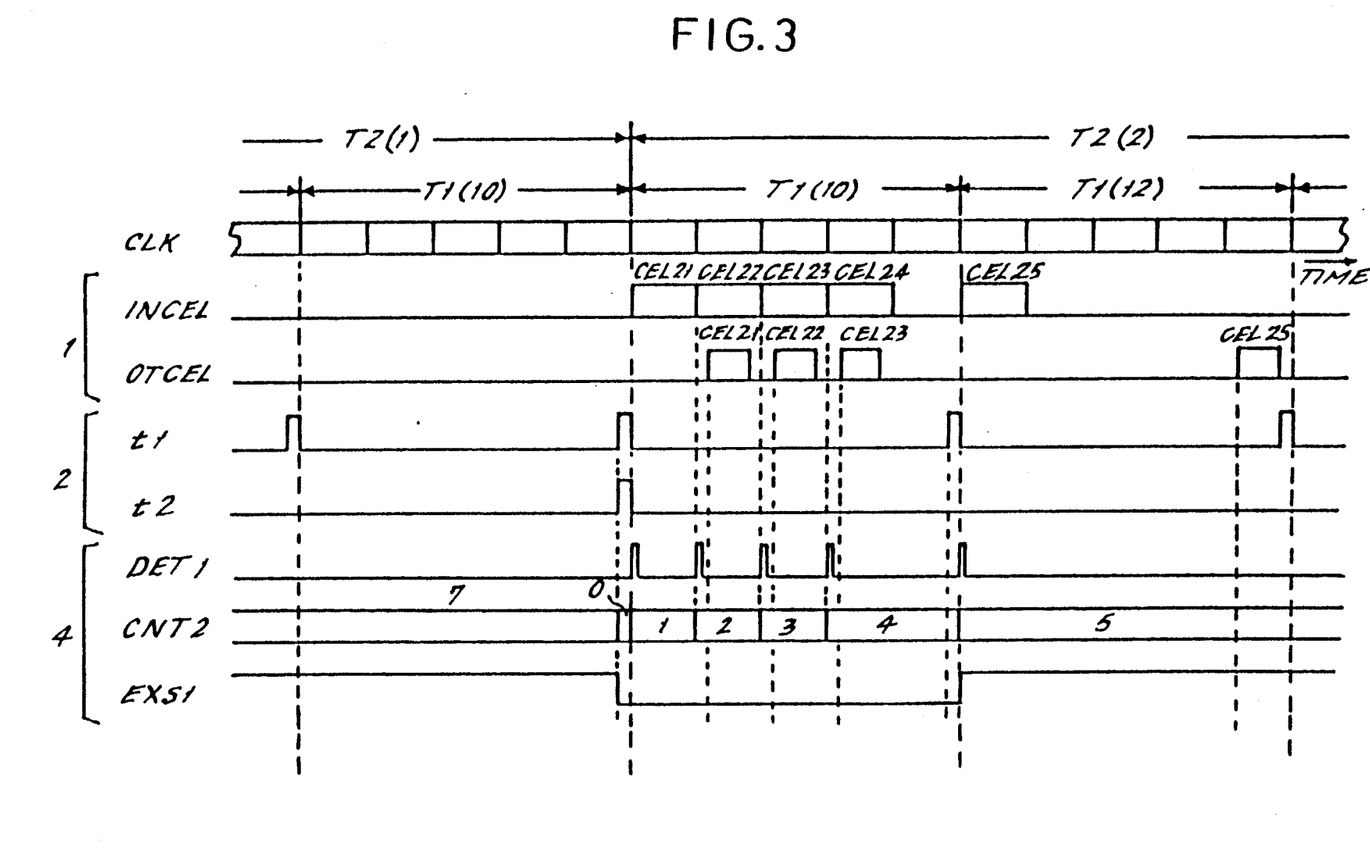

Next, in describing the operation of this preferred embodiment in further detail with reference to FIGS. 2 and 3 together, the maximum number of cells transferable within the period of the first cycle T1 (MN1) is supposed to be 3, and that within the period of the second cycle T2 (MN2), to be 5. The second cycle T2 is supposed to be 10 times as long as the first cycle T1. The ratio of cycles being so set, the average of the maximum number of cells transferable within the period of the cycle T1 (AN) is 0.5. In accordance with these conditions, the REF1, REF2 and REF3 are respectively preset to 5, 3 and 5.

In a first period T1(1) defined by the first cycle T1, input cells INCEL (CEL1 and CEL2), upon completion of the inputting (more exactly, after the elapse of a length of time equivalent to one byte-parallel cell), are transferred from the cell buffer memory circuit 1 as output cells OTCEL. In this state, since the number of cells transmitted in the period T1(1) does not exceed 3, which is the maximum number (MN1=3) of transferable cells, the signal S1 is not generated by the second excess cell processing circuit 5, and therefore the selector 32 selects the output signal RDB of the delay circuit 30 as the reading pulse RDA. Also, in the next period T1(2) following the period T1(1), input cells INCEL (CEL3 and CEL4), similarly to the cells CEL1 and CEL2, are read out and transferred as output cells OTCEL immediately after the completion of the inputting.

When an input cell INCEL (CEL5) has been transmitted to the buffer memory circuit 1 in a period T1(3), the comparator 42 of the first excess cell processing circuit 4 detects that the number of cells has reached 5, and supplies the excess cell detection signal EXS1 to the selector 32. In response to this signal EXS1, the selector 32 reads out, and selects as the reading pulse RDA, the output signal RDC of the pulse generator 34. As a result, the input cell CEL5 is read out at the final moment of the next period T1(4) as the output cell OTCEL, and is transferred. Further, at the time of the generation of the reading pulse RDA corresponding to the cell CEL5, since the comparator 61 of the third excess cell processing circuit 6 detects the generation of five reading pulses RDA, as many as the maximum number of cells transferable in the period T2(1) (MN2=5), the excess cell detection signal EXS2 is supplied to the control circuit 3. Responding to this signal EXS2, the control circuit 3 suspends the further generation of reading pulses RDA and RD and, since the selector 31 has already been switched over in accordance with the excess cell detection signal EXS1, all the input cells INCEL (CEL6 and CEL7) transmitted during the period T1(4) through T1(10) are discarded.

During the first part T1(11) of the T2(2) following the period T2(1) corresponding to the second cycle T2, which expires with the completion of the period T1(4) through T1(10), input cells INCEL (CEL21, 22, 23 and 24) are consecutively transmitted to the buffer memory circuit 1. Of this series of cells, the cells CEL21, 22 and 23 are transferred as output cells OTCEL immediately upon completion of their inputting to the buffer memory circuit 1. When the reading pulse RDA corresponding to the cell CEL23 is supplied to the processing circuit 5, the comparator 52, into which the count CNT2 is entered, detects that three cells, as many as the maximum number of cells transferable per period corresponding to the cycle T1 (MN1=3), have already been read out of the buffer memory circuit 1, and the clear signal CLR is supplied to the buffer memory circuit 1. As the buffer memory circuit 1 is initialized in response to this clear signal CLR, the cell CEL24, which is the final one of the series of input cells, is discarded. Thus in the period T1(11), cell discarding takes place on the basis of the maximum 3 per period corresponding to the cycle T1 (MN1=3).

At the time of the completion of the period T1(11), the count CNT1 from the counter 41 indicates 4 as the number of cells, and the number of reading pulses indicated by the count CNT3 of the counter 61 is 3, none of which exceeds 5, the maximum number of cells transferable within the period corresponding to the cycle T2 (MN2=5). In the period T1(12) following the period T1(11), regarding the input cell INCEL (CEL25) which has been transmitted, the comparator 32 detects that the number of cells transmitted during the period corresponding to the cycle T2 has reached 5, the maximum number of cells transferable within the period corresponding to that cycle (MN2=5), and the excess cell detection signal EXS1 is sent out to the control circuit 3. In response to this signal EXS1, the selector 32 selects and outputs as the reading pulse RDA the output signal RDC from the generator 34. Therefore, the input cell CEL25 is read out from the buffer memory circuit 1 at the final moment of the period T1(12), and is transferred. Further, the input cell INCEL first entered in any of the periods T1(13) through T1(20) following the period T1(12), is read out of the buffer memory circuit 1 in accordance with the reading pulse RD generated at a rate of 0.5, which is the average number of input cells permitted within the period T2(2) (AN=0.5), and is transferred.

As hitherto described, according to the present invention, the maximum numbers of cells (MN1 and MN2) transferable within a first period (corresponding to a cycle T1) and a second period (corresponding to a cycle T2), which is equal in length to an integral multiple of that of the first period and is sufficiently long, and the average per said first period are set and, when the traffic is heavy, cells are transferred at the maximum number of transferable cells to make it possible to reduce the number of discarded cells. Further, the traffic can be smoothed to avoid uneven traffic density by transferring cells, after the number of cells transmitted has reached the average, at that average transfer rate.

Other alternatives and modifications to the above-mentioned embodiment can be made within the scope of the invention defined by the appended claims.

What is claimed is:

1. A cell flow control unit for use in asynchronous transfer mode (ATM) transmission networks, comprising:

first means for temporarily storing a plurality of ATM cells each of which has a predetermined number of bits and is transmitted at any time interval via at least one of an input virtual path and an input virtual channel in a sequence of transmission;

second means for generating first and second timing pulses to define respectively a first period of a predetermined length and a second period equal in length to an integral multiple of the predetermined length;

third means for generating a first pulse sequence to be fed to said first means to read said ATM cells out of said first means and transferring the ATM cells to an output virtual path and at least one of an output virtual channel and a self-routing switch, and a second pulse sequence indicating how many times said ATM cells have been read out of said first means;

fourth means responsive to said first timing pulse for counting the pulses of said second pulse sequence to generate a first count, comparing said first count and a first reference value corresponding to the maximum number of cells which can be transferred within said first period and, when the first count and the first reference value are found identical, initializing said first means;

fifth means responsive to said second timing pulse for counting the number of said ATM cells to generate a second count, comparing said second count and a second reference value corresponding to the maximum number of cells which can be transferred within said second period, generating a first excess cell detection signal when the second count and the second reference value are found identical, supplying the first excess cell detection signal to said third means, and controlling said third means so as to cause said third means to be responsive to said first excess cell detection signal for generating said first and second pulse sequences at time intervals corresponding to the average for said first period of said maximum number of cells which can be transferred within said second period; and sixth means responsive to said second timing pulse for counting the pulses of said second pulse sequence to generate a third count, comparing said third count and a third reference value corresponding to the maximum number of cells which can be transferred within said second period, generating a second excess cell detection signal when the third count and the third reference value are found identical, and supplying the second excess cell detection signal to said third means to stop the generation of said first and second pulse sequences.

2. A cell flow control unit for use in ATM transmission networks, as claimed in claim 1, wherein said third means comprises first pulse signal generating means responsive to the storing of each of said plural ATM cells into said first means for generating an ATM cell input pulse sequence; second pulse signal generating means for generating an average value pulse sequence having a time interval corresponding to the average for said first period of said maximum number of cells transferable within said second period; and selector means responsive to said first excess cell detection signal for selecting at least one of said ATM cell input pulse sequence or said average value pulse sequence as said first and second pulse sequences.

3. A cell flow control unit for use in ATM transmission networks, as claimed in claim 1, wherein said fourth means comprises first counter means for counting the pulses of said second pulse sequence and generating the first count; comparator means for comparing said first count and said first reference value and, then the first count and the first reference volume have become equal, generating a first identity signal; and initializing signal generating means responsive to said first identity signal for generating an initializing signal for initializing said first means.

4. A cell flow control unit for use in ATM transmission networks, as claimed in claim 1, wherein said fifth means comprises second counter means responsive to the storing of each of said plural ATM cells into said first means for counting the number of said ATM cells and generating said second count; and second comparator means for comparing said second count and said second reference value and, when the second count and the second reference value have become equal, generating said first excess cell detection signal.

5. A cell flow control unit for use in ATM transmission networks, as claimed in claim 1, wherein said sixth means comprises third counter means for counting the pulses of said second pulse sequence and generating said third count; third comparator means for comparing said count and said third reference value and generating a second identity signal indicating that the third count and the third reference value have become equal; and means responsive to said second identity signal for generating said second excess cell detection signal.

6. A cell flow control method for asynchronous transfer mode (ATM) transmission networks, comprising the steps of:

temporarily storing in a memory a plurality of ATM cells each of which has a predetermined number of bits and is transmitted at any time interval via at least one of an input virtual path and an input virtual channel in a sequence of transmission;

generating first and second timing pulses to define respectively a first period of a predetermined length and a second period equal in length to an integral multiple of the predetermined length;

generating a first pulse sequence to read said ATM cells out of the memory and transferring the ATM cells to an output virtual path and at least one of an output virtual channel and a self-routing switch, and a second pulse sequence indicating how many times said ATM cells have been read out of the memory;

counting the pulses of said second pulse sequence in response to the first timing pulse to generate a first count, comparing said first count and a first reference value corresponding to the maximum number of cells which can be transferred within said first period and, when the first count and the first reference value are found identical, initializing the memory;

counting the number of said ATM cells in response to said second timing pulse to generate a second count, comparing said second count and a second reference value corresponding to the maximum number of cells which can be transferred within said second period, generating a first excess cell detection signal when the second count and the second reference value are found identical, and generating said first and second pulse sequences in response to said first excess cell detection signal at time intervals corresponding to the average for said first period of said maximum number of cells which can be transferred within said second period; and counting the pulses of said second pulse sequence in response to said second timing pulse to generate a third count, comparing said third count and a third reference value corresponding to the maximum number of cells which can be transferred within said second period and generating a second excess cell detection signal when the third count and the third reference value are found identical, and using the second excess cell detection signal to stop the generation of said first and second pulse sequences.

7. A cell flow control method for ATM transmission networks, as claimed in claim 6, wherein said step of generating a first pulse sequence comprises:

generating an ATM cell input pulse sequence in response to the storing of each of said plural ATM cells into said memory;

generating an average value pulse sequence having a time interval corresponding to the average for said first period of said maximum number of cells transferable within said second period; and selecting in response to said first excess cell detection signal at least one of said ATM cell input pulse sequences and said average value pulse sequences as said first and second pulse sequences.

8. A cell flow control method for use in ATM transmission networks, as claimed in claim 6, wherein said step of comparing said first count and said first reference value comprises generating a first identity signal when the first count and the first reference value have become equal; and said step of initializing comprises generating an initializing signal in response to said first identity signal for initializing said memory.

9. A cell flow control method for use in ATM transmission networks, as claimed in claim 6, wherein said step of counting the number of said ATM cells comprises counting the number of said ATM cells in response to the storing of each of said plural ATM cells into said memory and generating said second count; and comparing said second count and said second reference value and, when the second count and the second reference value have become equal, generating said first excess cell detection signal.

10. A cell flow control method for use in ATM transmission networks, as claimed in claim 6, wherein said step of comparing said third count and said third reference value comprises generating a second identity signal indicating that the third count and the third reference value have become equal; and generating said second excess cell detection signal in response to said second identity signal.

* * * * *